(12) United States Patent
Olsson et al.

(10) Patent No.: US 11,778,374 B2
(45) Date of Patent: Oct. 3, 2023

(54) CONFERENCE DEVICE WITH VOICE DIRECTION ESTIMATION

(71) Applicant: GN Audio A/S, Ballerup (DK)

(72) Inventors: Rasmus Kongsgaard Olsson, Ballerup (DK); Thomas Fuglsang, Ballerup (DK)

(*) Notice: Subject to any disclaimer, the term of this patent is extended or adjusted under 35 U.S.C. 154(b) by 46 days.

(21) Appl. No.: 17/666,604

(22) Filed: Feb. 8, 2022

(65) Prior Publication Data

US 2022/0272447 A1     Aug. 25, 2022

(30) Foreign Application Priority Data

Feb. 24, 2021  (EP) ..................................... 21159077

(51) Int. Cl.
| | |
|---|---|
| *H04R 3/00* | (2006.01) |
| *G06N 3/08* | (2023.01) |
| *G10L 25/30* | (2013.01) |
| *G10L 25/78* | (2013.01) |
| *H04L 65/403* | (2022.01) |

(Continued)

(52) U.S. Cl.
CPC .............. *H04R 3/005* (2013.01); *G06N 3/08* (2013.01); *G10L 25/18* (2013.01); *G10L 25/30* (2013.01); *G10L 25/78* (2013.01); *H04L 65/1089* (2013.01); *H04L 65/403* (2013.01); *H04M 3/568* (2013.01); *H04R 1/406* (2013.01); *H04M 2201/40* (2013.01); *H04R 2201/401* (2013.01)

(58) Field of Classification Search
CPC .......... H04R 3/005; H04R 1/406; G06N 3/08; G10L 25/30; G10L 25/78; H04M 3/568; H04L 65/403

USPC ................................ 381/92, 56, 58, 73.1, 77
See application file for complete search history.

(56) References Cited

U.S. PATENT DOCUMENTS

| | | | |
|---|---|---|---|
| 9,554,091 B1* | 1/2017 | Malegaonkar | ......... H04N 7/152 |
| 9,942,513 B1* | 4/2018 | Aarrestad | .............. H04N 7/147 |
| 9,972,339 B1 | 5/2018 | Sundaram | |

FOREIGN PATENT DOCUMENTS

| | | |
|---|---|---|
| CN | 112185413 A | 1/2021 |
| WO | 2020250797 | 12/2020 |

OTHER PUBLICATIONS

XP80842776—Soumitro Chakrabarty et al.—Multi-peaker Localization sing Convolutional Neural Network Trained with Noise; Arxic. Org. Cornell University Library 2021, NY, Dec. 12, 2017.

(Continued)

*Primary Examiner* — Thjuan K Addy (57) ABSTRACT

A conference device and a computer-implemented method for training a neural network are disclosed, the conference device comprising a conference controller; a microphone array comprising a plurality of microphones for provision of audio signals representing audio from one or more sound sources; a direction estimator connected to the conference controller and the microphone array, the direction estimator configured to obtain, from the microphone array, a plurality of audio signals including a first audio signal and a second audio signal; determine direction data based on the plurality of audio signals, the direction data comprising an indication of an estimated probability of voice activity for one or more directions, wherein to determine direction data comprises to apply an offline-trained neural network; and output audio data based on the direction data to the conference controller.

19 Claims, 4 Drawing Sheets

(51) Int. Cl.
*H04M 3/56* (2006.01)
*H04R 1/40* (2006.01)
*G10L 25/18* (2013.01)
*H04L 65/1089* (2022.01)

(56) References Cited

OTHER PUBLICATIONS

XP33793318—Mack Wolfgang et al.—Signal-Aware Broadband DOA Estimation Using Attention Mechanisms; ICASSP 2020—2020 IEEE International Conference on Acoustics, Speech and Signal Processing, IEEE, May 4, 2020, pp. 4930-4934.
XP31011050—Marian Kepesi et al.—Audio-Visual Feature Extraction for Semi-Automatic Annotation of Meetings; 2006 IEEE Workshop on Multimedia Signal Processing, Victoria, BC, Canada, Oct. 3-6, 2006, IEEE Service Center, Piscataway, NJ, Oct. 2, 2006, pp. 207-211.

\* cited by examiner

CONFERENCE DEVICE WITH VOICE DIRECTION ESTIMATION

The present disclosure relates to a conference device and related methods, in particular for analysing, monitoring and/or evaluating audio and speech of one or more participants in a conference. In particular, a method of training a neural network for determining direction of arrival of audio/voice is disclosed

BACKGROUND

Remote conferencing and in particular video conferences have gained increasing interest in continuation of the increased focus on reducing travel costs and associated environmental impact. Further, developments in the public healthcare with outbreak of infectious diseases has increased the need for effective and easy-to-use video conference solutions.

SUMMARY

Accordingly, there is a need for systems, electronic devices, and methods with improved video conference features, such as estimation of speech source positions.

A conference device is disclosed, the conference device comprising a conference controller; a microphone array comprising a plurality of microphones for provision of audio signals representing audio from one or more sound sources; and a direction estimator connected to the conference controller and the microphone array. The direction estimator is configured to obtain, from the microphone array, a plurality of audio signals including a first audio signal and a second audio signal; determine direction data based on the plurality of audio signals, the direction data optionally comprising an indication of an estimated probability of voice activity for a plurality of directions, wherein to determine direction data comprises to apply a neural network, such as an offline-trained neural network; and output audio data based on the direction data to the conference controller.

Further, a method, such as a computer-implemented method, for training a neural network to process as inputs a plurality of audio signals comprising a first audio signal and a second audio signal obtained from a microphone array arranged in a conference room and provide as output an indication of an estimated probability of voice activity for a plurality of directions relative to the microphone array is provided. The method comprises executing, by a computer, multiple training rounds, wherein each training round comprises: determining a training data set comprising a first training audio signal, a second training audio signal, and a target direction; applying the first training audio signal and the second training audio signal as respective inputs to the neural network; determining an error signal based on an output of the neural network and the target direction; and using a learning rule to adjust weights of the neural network based on the error signal. Determining a training data set is based on all of: a user speech signal selected from a plurality of speech signals each indicating speech from a first person; a noise sound signal selected from a plurality of noise sound signals each indicating an ambient noise sound; a room model selected from a plurality of room models each indicating a spatial extension and one or more acoustic properties of a conference room; a user position within the spatial extension indicated by the selected room model; and an array position defining a first microphone position and a second microphone position within the spatial extension indicated by the selected room model. Determining the first training audio signal and the second training audio signal comprises determining a first impulse response of a first acoustic path from the user position to the first microphone position and a second impulse response of a second acoustic path from the user position to the second microphone position based on one or more acoustic properties indicated by the selected room model; estimating first sound arriving at the first microphone position by combining the result of applying the first impulse response to the speech indicated by the selected user speech signal and the ambient noise sound indicated by the selected noise sound signal; estimating second sound arriving at the second microphone position by combining the result of applying the second impulse response to the speech indicated by the selected user speech signal and the ambient noise sound indicated by the selected noise sound signal; and determining the first training audio signal based on the first sound and the second training audio signal based on the second sound. In the method, determining the target direction comprises determining a direction of arrival of user speech at the microphone array based on the user position and the array position; and selecting the target direction from the plurality of directions, such that the target direction does not differ more from the determined direction of arrival than any other direction in the plurality of directions. Determining the error signal optionally comprises: determining a classification error for each of the plurality of directions based on the respective probability of voice activity indicated in the output of the neural network such that the classification error for the target direction increases when the indicated probability of voice activity decreases and the classification error for each other direction of the plurality of directions increases when the indicated probability of voice activity increases; and determining the error signal based on the classification errors for all of the plurality of directions.

It is an advantage of the present disclosure that more accurate and precise direction-of-arrival estimation is provided, which in turn may lead to improved control of conference solutions and systems.

Further, the present disclosure provides an improved neural network model architecture which efficiently handles and analyses audio from a number of sources/speakers.

Further, the present disclosure provides improved accuracy of direction-of-arrival modelling/estimation/determination by leveraging physical room dimensions and different speaker positions in a neural network.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Within this document, and where not stated otherwise, the term "probability" when applied to the presence of signals of a specific class, such as "voice activity" or "noise", refers to a probability, a likelihood, a confidence, or another suitable indicator, such as e.g. a classification confidence, such as a number, e.g. in the interval [0, 1], that generally increases with increasing presence of signals of that specific class. Such indicators may include statistically valid estimates of probability of the presence of signals of that specific class. Corresponding considerations apply to the term "probability" when applied to the absence of signals of a specific class.

A conference device is disclosed. The conference device comprises an interface and a conference controller. The conference device may be a conference audio device.

The conference device comprises or is in communication with a microphone array comprising a plurality of microphones for provision of audio signals representing audio from one or more sound sources. The microphone array comprises a first microphone for provision of a first audio signal also denoted s_1 and a second microphone for provision of a second audio signal also denoted s_2. The microphone array may comprise N microphones, where N is the number of microphones, such as 4, 5, 6, 7, 8, 9, 10. In one or more exemplary conference devices, the microphone array comprises at least four microphones, i.e. N≥4. Thus, the plurality of audio signals may comprise a third audio signal s_3 and/or a fourth audio signal s_4. In one or more exemplary conference devices, the microphone array is arranged in a 2×N/2 array.

The conference device comprises a direction estimator connected to the conference controller and the microphone array. The direction estimator is configured to obtain, from the microphone array, a plurality of audio signals including a first audio signal s_1 and a second audio signal s_2; determine direction data also denoted D_DATA based on the plurality of audio signals, wherein to determine direction data comprises to apply an offline-trained neural network; and output audio data also denoted A_DATA based on the direction data D_DATA to the conference controller.

The direction data D_DATA may comprise an indication of an estimated probability of voice activity for a plurality of directions.

In one or more exemplary conference devices, the neural network is configured to determine the direction data. To determine the direction data may comprise to estimate a first direction probability P_D_1 indicative of a probability of voice activity in a first direction D_1 and/or to estimate a second direction probability P_D_2 indicative of a probability of voice activity in a second direction D_2. To determine the direction data may comprise to estimate M direction probabilities, also denoted P_D_m for m=1, 2, . . . , M for M respective directions, D_m, m=1, 2, . . . , M. In one or more exemplary conference devices, the number M of directions is at least 10, i.e. M≥10, such as in the range from 20 to 100. In other words, the direction data may comprise direction data of at least 10 directions.

In one or more exemplary conference devices, the inter-direction angle between neighbouring directions is in the range from 1° to 20°, such as in the range from 2° to 10°. The inter-direction angle between neighbouring directions may be less than 6°, such as 1°, 2°, 3°, 4°, or 5°. A small inter-direction angle provides a more accurate estimation of the direction or arrival but may require a larger number of microphones in the microphone array.

In other words, the direction data may comprise M direction probabilities P_D_m, m=1, 2, . . . , M, wherein m is an index for the m'th direction. The direction probabilities P_D_m may be estimated probabilities of voice activity in the m'th direction. In one or more exemplary conference devices, the number M of directions is larger than 20, such as in the range from 25 to 50, e.g. combined with an inter-direction angle between neighbouring directions in the range from 2° to 10°, such as 2°, 3°, 4°, 5°, 6°, 7°, 8°, 9°, or 10°.

In one or more exemplary conference devices, the direction estimator comprises a post-processor. The post-processor is configured to post-process the output of the neural network, such as the direction data, e.g. for provision of the audio data. The post-processor may be configured to determine a main direction of arrival based on the direction data, and include the main direction of arrival also denoted DOA or an indication thereof in the audio data A_DATA. The DOA may be an angle or an index value that can be mapped to an angle. In other words, the audio data may comprise a main direction of arrival indicative of a direction of arrival of speech or voice. In one or more exemplary directions estimators, the main direction of arrival may be determined as the direction of the M directions having the largest direction probability.

In one or more exemplary conference devices, the direction date/audio data comprises a non-voice activity parameter also denoted NVA. The NVA may be indicative of a probability of absence of voice activity in the audio signals. The NVA may be indicative of or include a probability of presence of noise or other un-desired sounds in the audio signals. Examples of noise in the audio signals may include one or more of sounds of door opening/closing, moving furniture, coughing and/or sneezing, ventilator noise, scratching or tapping a surface, such as a table or keyboard, or paper. Examples of undesired sounds in the audio signals may be voice from other directions than the directions covered by the direction data. The NVA may be indicative of a probability of silence, i.e. that no audio is detected by the microphone array. In one or more exemplary conference devices, a NVA may be given as:

$$NVA = 1 - \sum_{m=1}^{M} P\_D\_m$$

In one or more exemplary conference devices, the direction data/audio data comprises a non-voice activity parameter also denoted NVA_m for one or more, such as all directions m=1, 2, . . . , M.

In one or more exemplary conference devices, the direction data/audio data comprises a non-voice activity parameter for one or more direction ranges, such as one or more of a main direction range (NVA_R_0), a first direction range (NVA_R_1), a second direction range (NVA_R_2), a third direction range (NVA_R_3), and a fourth direction range (NVA_R_4). The main direction range may be a front direction range, e.g. with an angle range from −30° to 30°. The first direction range may be a front-right direction range, e.g. with an angle range from 0° or 30° to 90°. The second direction range may be a front-left direction range, e.g. with an angle range from −90° to 0° or −30°. The third direction range may be a behind direction range e.g. with an angle range from −180° to −90° and from 90° to 180°. The third direction range may be a behind-left direction range e.g. with an angle range from −180° to −90°. The fourth direction range may be a behind-right direction range e.g. with an angle range from 90° to 180°.

Note that if a non-voice activity parameter NVA for all directions, or a non-voice activity parameter NVA_R_r for a direction range, is computed by summing multiple direction probabilities P_D_m as explained above, then the respective non-voice activity parameter may have a negative value, e.g. when the direction estimator detects voice activity for more than one direction.

In one or more exemplary conference devices, the direction data/audio data comprises one or more direction probabilities indicative of a probability of voice activity in respective one or more directions. In other words, the audio data may comprise at least part of, such as all, the direction data. In one or more exemplary conference devices, the audio data comprises a main direction of arrival optionally with associated direction probability indicative of a probability of voice activity in the main direction of arrival. The audio data may comprise a secondary direction of arrival also denoted DOA_2 optionally with associated direction probability indicative of a probability of voice activity in a secondary direction of arrival. The secondary direction of arrival may be based on the direction data. The secondary direction of arrival may be an angle or an index value that can be mapped to an angle. In one or more exemplary directions estimators, the secondary direction of arrival may be determined as the direction of the M directions having the second-largest direction probability. The audio data may comprise a tertiary direction of arrival also denoted DOA_3 optionally with associated direction probability indicative of a probability of voice activity in a tertiary direction of arrival. The tertiary direction of arrival may be based on the direction data. The tertiary direction of arrival may be an angle or an index value that can be mapped to an angle. In one or more exemplary directions estimators, the tertiary direction of arrival may be determined as the direction of the M directions having the third-largest direction probability. In other words, the audio data may comprise a list, such as a prioritized list, of directions where a direction probability is high.

In one or more exemplary conference devices, the direction data covers directions spanning at least −45 degrees to 45 degrees in relation to a front direction of the microphone array, the directions optionally having a pre-defined angle therebetween. It is noted that directions herein are given in relation to the front direction or zero direction of the microphone array. Other reference directions may be applied within the scope. The direction data optionally covers directions spanning at least −60 degrees to 60 degrees, such as at least −75 degrees to 75 degrees in relation to a front direction of the microphone array. In one or more exemplary conference devices, the direction data covers directions spanning at least −90 degrees to 90 degrees in relation to a front direction of the microphone array. The direction data may cover directions spanning an angle range of at least 60°, e.g. at least 90°, at least 120°, or at least 150°.

In one or more exemplary conference devices, to determine direction data comprises to estimate a noise probability indicative of a probability of presence of noise in the audio signals. Accordingly, the direction data may comprise a noise probability also denoted P_N indicative of a probability of presence of noise in the audio signals. The direction data may comprise noise probabilities also denoted P_N_m for one or more, such as all, directions D_m, m=1, 2, . . . , M. Examples of noise in the audio signals may include one or more of sounds of door opening/closing, moving furniture, coughing and/or sneezing, ventilator noise, clicking pen, scratching or tapping a surface, such as a table or keyboard, and paper being shuffled.

In one or more exemplary conference devices, the direction data/audio data comprises a noise probability indicative of a probability of presence of noise in one or more direction ranges, such as one or more of a main direction range (P_N_R_0), a first direction range (P_N_R_1), a second direction range (P_N_R_2), a third direction range (P_N_R_3), and a fourth direction range (P_N_R_4).

In one or more exemplary conference devices, to estimate a noise probability indicative of a probability of presence of noise in the audio signals comprises to estimate a first noise probability also denoted P_N_1 indicative of a probability of presence of noise in the first direction and/or to estimate a second noise probability also denoted P_N_2 indicative of a probability of presence of noise in the second direction. To estimate a noise probability indicative of a probability of presence of noise in the audio signals may comprise to estimate noise probabilities for M directions, i.e. to estimate P_N_m for m=1, 2, . . . , M.

In one or more exemplary conference devices, the direction estimator comprises a pre-processor configured to pre-process the audio signals and provide a neural network input to the neural network based on the audio signals.

In one or more exemplary conference devices, the pre-processor is configured to determine a first real spectrogram also denoted P_R_1 of the first audio signal and a first imaginary spectrogram P_I_1 of the first audio signal and provide the first real spectrogram P_R_1 and the first imaginary spectrogram P_I_1 in the neural network input. The pre-processor is optionally configured to determine a real spectrogram P_R_n, n=1, 2, . . . , N for each of the N audio signals from respective N microphones in the microphone array and provide the real spectrograms P_R_n, n=1, 2, . . . , N in the neural network input. The pre-processor is optionally configured to determine an imaginary spectrogram P_I_n, n=1, 2, . . . , N for each of the N audio signals from respective N microphones in the microphone array and provide the imaginary spectrograms P_I_n, n=1, 2, . . . , N in the neural network input.

The pre-processor preferably comprises an ND converter or a plurality of ND converters for digitizing the audio signals from the microphones. In some exemplary conference devices, ND conversion may instead be made in the microphone array.

To determine real and imaginary spectrograms may comprise sampling audio signals with a sampling rate larger than 8 kHz, such as at least 16 kHz, e.g. in the range from 6 kHz to 40 kHz, such as 32 kHz.

The real and imaginary spectrograms may each comprise at least 128 values, such as 256 values for respective 256 frequency bands or bins, and may be based on a Hahn window with a frame size of 512 samples, e.g. with a hop size of 256 samples and/or 50% overlap.

The neural network input may comprise K real and imaginary spectrograms for each audio signal, wherein K may be at least 20. In other words, the neural network input may comprise K real and imaginary spectrograms for each audio signal. In one or more exemplary conference devices, the number K is in the range from 20 to 60, such as about 40 corresponding to about 0.5 seconds of audio. In other words, each audio signal may be represented by a complex FFT K×512 matrix with K×256 real and K×256 imaginary values. Thereby the audio signals are represented in a substantially loss-less representation advantageously maintaining both phase and amplitude which are important parameters in determining direction of arrival and to differentiate voice and noise/non-voice.

In one or more exemplary conference devices, the direction estimator comprises a post-processor configured to post-process a neural network output from the neural network and provide the audio data based on the neural network output. In one or more exemplary conference devices, the direction data may be fed directly to the conference controller. In other words, the output of the neural network may be fed as audio data to the conference controller.

In one or more exemplary conference devices, the neural network is a deep neural network, such as a convolutional neural network (CNN). The convolutional neural network may comprise an input, a number J of layers, and an output. The J layers may comprise J_C convolution layers denoted CONV_j, j=1, 2, . . . , J_C, including a first convolution layer CONV_1 and a second convolution layer CONV_2, and J_O output layers including a first output layer OUT_1 and optionally a second output layer OUT_2. The first output layer OUT_1 may be a fully connected output layer and/or the second output layer OUT_2 may be a fully connected output layer. The J_O output layers may preferably follow the J_C convolution layers.

The input to the neural network may comprise real and imaginary spectrograms of each audio signal s_1, s_2, . . . , s_N. The output may comprise class probabilities of M directions, e.g. 37 directions (M=37) with an inter-direction angle of 5 degrees corresponding to angles from −90° to 90°. The class probabilities may relate to one or more audio signal classes selected from the signal classes voice activity, noise and silence. The output may comprise a non-voice activity parameter.

In one or more exemplary convolutional neural networks, the number of convolutional layers is in the range from 5 to 15, such as from 10 to 12. One or more of the convolutional layers may have a kernel dimension of 3×3. One or more of the convolutional layers may have a stride of 2,1. One or more of the convolutional layers may have a stride of 1,1. One or more of the convolutional layers may have a dilation of 1,2. One or more of the convolutional layers may have a dilation of 1,4. One or more of the convolutional layers may have a dilation of 1,8.

The numbers of layers, such as the total number of layers in the neural network, the number J_C of convolution layers, and/or the number J_O of output layers, may be varied to improve performance and/or reduce power consumption when the neural network is to be used with other array configurations than disclosed herein, such as microphone arrays with more microphones. The same applies to the properties of the input signals, such as sample rates, the number of spectrogram bins, frame sizes, window overlap and length of spectrogram buffers, as well as to the properties of individual network layers, such as kernel dimensions, stride and dilation. Typically, a larger neural network will be required for a larger number of microphones.

An exemplary neural network configuration CNN A is outlined in table 1 below, where k is kernel dimension, s is stride, d is dilation. This configuration was optimized for a microphone array with 8 microphones and for outputting class probability of voice activity for 37 directions as well as a general voice activity indication.

TABLE 1

| Layers | CNN A |
| --- | --- |
| CONV_1 | 16 × 16, k: 3 × 3, s: 2.1, d: 1.1 |
| CONV_2 | 16 × 25, k: 3 × 3, s: 2.1, d: 1.1 |
| CONV_3 | 25 × 25, k: 3 × 3, s: 1.1, d: 1.1 |
| CONV_4 | 25 × 30, k: 3 × 3, s: 2.1, d: 1.2 |
| CONV_5 | 30 × 30, k: 3 × 3, s: 1.1, d: 1.2 |
| CONV_6 | 30 × 40, k: 3 × 3, s: 2.1, d: 1.1 |
| CONV_7 | 40 × 40, k: 3 × 3, s: 1.1, d: 1.1 |
| CONV_8 | 40 × 40, k: 3 × 3, s: 2.1, d: 1.4 |
| CONV_9 | 40 × 40, k: 3 × 3, s: 1.1, d: 1.4 |
| CONV_10 | 40 × 5, k: 3 × 3, s: 2.1, d: 1.8 |
| CONV_11 | 5 × 5, k: 3 × 3, s: 1.1, d: 1.8 |
| OUT_1 | 165 × 165 |
| OUT_2 | 165 × 38 |

In one or more exemplary conference devices, the conference device comprises a camera or camera device connected to the conference controller for provision of a camera video stream/video data, and wherein the conference controller is configured to determine an output video stream based on the camera video stream and/or the audio data.

The conference controller may be configured to determine an output audio stream based on the audio signals and/or the audio data.

The conference controller may be configured to determine and output conference data via an interface/connector, such as a wireless interface, or a USB-A or USB-C connector. The conference data may comprise the output video stream and/or the output audio stream. In one or more exemplary conference devices, the conference data comprises the audio data. Thereby, a host device may be enabled to process the output video stream and/or the output audio stream from the conference device.

The conference controller may control the camera device to provide a desired camera video stream via control signals. The control signals from the conference controller to the camera device may be based on the audio data from the direction estimator. For example, the conference controller may be configured to control the camera device to zoom to a first region in the first direction if DOA of the audio data indicates the first direction as the main direction of arrival. The conference controller may be configured to zoom on a region in the camera video stream V_DATA according to DOA of the audio data A_DATA.

Generally, the conference controller may be configured to control the camera device to zoom to an m'th region in the m'th direction if DOA of the audio data indicates the m'th direction as the main direction of arrival. The conference controller may be configured to zoom on an m'th region in the V_DATA according to DOA indicating an m'th direction of the audio data A_DATA.

The conference controller may be configured to control the camera device to provide a large field-of-view or non-zoomed video stream based on the non-voice activity parameter, e.g. if the non-voice activity parameter NVA is indicative of non-voice such as if NVA is larger than a threshold. The conference controller may be configured to provide a large field-of-view or non-zoomed video stream as the output video stream based on the non-voice activity parameter, e.g. if the non-voice activity parameter NVA is indicative of non-voice such as if NVA is larger than a threshold.

In one or more exemplary conference devices, the conference device is configured to deactivate the direction estimator based on detection of voice activity from a far end conference device. In other words, the conference controller may be configured to detect audio activity, such as voice activity, in an input audio stream to be output with one or more loudspeakers of the conference device and deactivate, pause, ignore or turn off, the direction estimator in accordance with a determination of audio/voice activity. Thereby is ensured that audio from far end conference devices does not disturb or destroy the direction estimation in the direction estimator.

Accordingly, the conference device may comprise one or more loudspeakers configured to output audio based on an input audio stream, e.g. received via interface/connector, such as a wireless interface, or a USB-A or USB-C connector. The interface for the input audio stream and/or conference data, such as output video stream and/or output audio stream, may be wireless.

In one or more exemplary conference devices, to determine direction data comprises to estimate a distance parameter indicative of a distance between the conference device and a sound source.

It is noted that descriptions of the conference device herein also apply to a corresponding method of operating a conference device. Accordingly, a method of operating a conference device is disclosed. The conference device may be a conference device as disclosed herein.

Further, the present disclosure relates to a computer-implemented method for training a neural network. The network is configured to process as inputs a plurality of audio signals comprising a first audio signal and a second audio signal obtained from a microphone array arranged in a conference room and provide as output an indication of an estimated probability of voice activity for a plurality of directions relative to the microphone array. The plurality of audio signals may be input to the neural network in different formats. For example, the audio signals may be input to the neural network as real and imaginary spectrograms or other suitable representations.

The method comprises executing, by a computer, multiple training rounds, wherein each training round comprises determining a training data set comprising a first training audio signal, a second training audio signal, and a target direction. Thus, determining a training data set may comprise one or more of determining, retrieving from a library/memory, or otherwise obtaining a first training audio signal and/or one or more of determining, retrieving from a library/memory, or otherwise obtaining a second training audio signal. The training audio signals of the training data set, e.g. the first training audio signal and/or the second training audio signal, may be simulated training audio signals. The training data set may comprise training audio signals for each microphone in the microphone array. In other words, the training data set for training the neural network CNN of conference device as described in FIGS. 1-3 with eight microphones comprises eight training audio signals.

Determining a training data set may comprise one or more of determining or otherwise obtaining a target direction.

The method comprises applying the training audio signals of the training data set, such as the first training audio signal and the second training audio signal as respective inputs to the neural network. Applying the training audio signals of the training data set as respective inputs to the neural network may comprise inputting real and imaginary spectrograms of the training audio signals to the neural network.

The method comprises determining an error signal based on an output of the neural network and the target direction; and train the neural network based on the error signal, e.g. by using a learning rule to adjust weights of the neural network based on the error signal.

In the method, determining a training data set, such as determining training audio signals, may be based on a user speech signal selected from a plurality of speech signals each indicating speech from a first person.

In the method, determining a training data set, such as determining training audio signals, may be based on a noise sound signal selected from a plurality of noise sound signals each indicating an ambient noise sound.

In the method, determining a training data set, such as determining training audio signals, may be based on a room model selected from a plurality of room models each indicating a spatial extension and one or more acoustic properties of a conference room. The spatial extension of a conference room may comprise one or more of length, width, height, shape, dimensions, and volume of the room. The acoustic properties of a conference room may comprise one or more of wall reflection coefficients, reverberation time, wall material, floor material, ceiling material, attenuation properties, furniture configuration, and microphone array position. By applying a room model in the training, the neural network is able to take into account reverberation phenomena typically present in conference rooms, and in particular in small conference rooms.

In the method, determining a training data set, such as determining training audio signals, may be based on a user position within the spatial extension indicated by the selected room model.

In the method, determining a training data set, such as determining training audio signals, may be based on an array position defining microphone positions including a first microphone position and a second microphone position within the spatial extension indicated by the selected room model. The array position may be given or included in the room model.

In the method, determining training audio signals, such as the first training audio signal and the second training audio signal, comprises determining a first impulse response of a first acoustic path from the user position to the first microphone position and a second impulse response of a second acoustic path from the user position to the second microphone position based on one or more acoustic properties indicated by the selected room model. Generally, determining training audio signals comprises determining respective impulse responses of each acoustic path from the user position to the respective microphone positions in the microphone array based on one or more acoustic properties and/or spatial extension indicated by the selected room model. The impulse responses may be estimated to take into account e.g. a general reverberation time for the modelled conference room, propagation delay and/or sound attenuation from the user position to the respective microphone positions and/or reflections of sound off the walls of the conference room.

The method comprises estimating first sound arriving at the first microphone position, e.g. based on a result of applying the first impulse response to the speech indicated by the selected user speech signal or by combining the result of applying the first impulse response to the speech indicated by the selected user speech signal and the ambient noise sound indicated by the selected noise sound signal.

The method comprises estimating second sound arriving at the second microphone position, e.g. based on a result of applying the second impulse response to the speech indicated by the selected user speech signal or by combining the result of applying the second impulse response to the speech indicated by the selected user speech signal and the ambient noise sound indicated by the selected noise sound signal. It is to be understood, that the method may comprise estimating sounds arriving at each of the microphone positions in the microphone array.

The method comprises determining training audio signals based on respective sounds including determining the first training audio signal based on the first sound and the second training audio signal based on the second sound. Determining training audio signals based on the respective sounds may be based on a microphone transfer function or microphone impulse response for respective microphones in the microphone array.

Determining training audio signals may comprise pre-processing and/or data transformation, e.g. as described above for the neural network module of the direction estimator.

In the method, determining the target direction comprises determining a direction of arrival of user speech at the microphone array based on the user position and the array position/room model. The method may comprise selecting the target direction from the plurality of directions e.g. such that the target direction does not differ more from the determined direction of arrival than any other direction in the plurality of directions. The method may comprise selecting the target direction as a direction of the plurality of directions that is near to or nearest to the target direction. In the method, determining the error signal comprises determining a classification error for each of the plurality of directions, e.g. based on the respective probability or indicator of voice activity indicated in the output of the neural network, for example such that the classification error for the target direction increases when the indicated probability of voice activity decreases and the classification error for each other direction increases when the indicated probability of voice activity increases. The error signal may be based on the classification errors. In other words, the method may comprise determining the error signal based on the classification errors for all of the plurality of directions.

In the method, determining the error signal comprises may further comprise increasing the classification error for the target direction if the absolute value of the difference between the target direction and the determined direction of arrival exceeds a predefined threshold, such as e.g. 1°, 2°, 3°, 4°, 5°, 10° or 20°, in order to train the neural network to classify speech from outside the angle range spanned by the direction data as non-speech or noise.

In one or more exemplary methods, determining a training data set, at least for a number of training rounds, is optionally further based on a jammer speech signal and a jammer position. The jammer speech signal may be selected from a plurality of speech signals each indicating speech from a second person different from the first person and the jammer position may be within the spatial extension indicated by the selected room model. The jammer position may be relative to the first person or to the front direction.

In one or more exemplary methods, determining training audio signals, e.g. determining the first training audio signal and the second training audio signal, comprises determining a third impulse response of a third acoustic path from the jammer position to the first microphone position and a fourth impulse response of a fourth acoustic path from the jammer position to the second microphone position using one or more acoustic properties and/or spatial extension indicated by the selected room model. Generally, determining training audio signals may comprise determining jammer impulse responses of respective jammer acoustic paths from the jammer position to respective microphone positions of the microphone array, e.g. using or based on one or more acoustic properties and/or spatial extension indicated by the selected room model. Microphone transfer functions or microphone impulse responses may be applied in the same way as for user speech.

In one or more exemplary methods, the method comprises, e.g. for a number of training rounds, estimating the first sound by combining the result of applying the first impulse response to the speech indicated by the selected user speech signal and a result of applying the third impulse response to the jammer speech signal.

In one or more exemplary methods, the method comprises, e.g. for a number of training rounds, estimating the first sound by combining the result of applying the first impulse response to the speech indicated by the selected user speech signal, a result of applying the third impulse response to the jammer speech signal, and the ambient noise sound indicated by the selected noise sound signal.

In one or more exemplary methods, the method comprises, e.g. for a number of training rounds, estimating the second sound by combining the result of applying the second impulse response to the speech indicated by the selected user speech signal and a result of applying the fourth impulse response to the jammer speech signal.

In one or more exemplary methods, the method comprises, e.g. for a number of training rounds, estimating the second sound based on by combining the result of applying the second impulse response to the speech indicated by the selected user speech signal, a result of applying the fourth impulse response to the jammer speech signal, and the ambient noise sound indicated by the selected noise sound signal.

In one or more exemplary methods, the method comprises estimating sounds arriving at each of the microphone positions in the microphone array by combining the result of applying the respective impulse response to the speech indicated by the selected user speech signal and a result of applying the respective jammer impulse response to the jammer speech signal.

In one or more exemplary methods, the method comprises estimating sounds arriving at each of the microphone positions in the microphone array by combining the result of applying the respective impulse response to the speech indicated by the selected user speech signal, a result of applying the respective jammer impulse response to the jammer speech signal, and the ambient noise sound indicated by the selected noise sound signal.

In one or more exemplary methods, the method further comprises estimating sounds arriving at each of the microphone positions in the microphone array by applying a respective noise impulse response to the ambient noise sound indicated by the selected noise sound signal, wherein the noise impulse response is determined in the same way as the jammer impulse response, however for a noise source position within the spatial extension indicated by the selected room model.

The method may further comprise executing, by the computer, multiple auxiliary training rounds in the same way as described above, however without user speech in order to train the neural network to also output class probabilities of noise for the plurality of directions. The method comprises varying, across the training rounds, the selection of respectively the user speech signal, the noise sound signal, the room model, and the user position. The user position may be selected from multiple user positions indicated in the selected room model or, alternatively or additionally, may be computed based on the spatial extension indicated by the selected room model, e.g. based on one or more parameters that are varied across the training rounds.

The method may further comprise varying, across the training rounds, the selection of respectively the jammer speech signal and/or the jammer position.

Optionally, the method further comprises varying, across the auxiliary training rounds, the selection of respectively the noise sound signal and the room model.

The method may further comprise varying, across the training rounds and/or the auxiliary training rounds, the array position and/or the microphone transfer functions or microphone impulse responses.

The above-described varying of the inputs to the training data sets may be performed by brute force, i.e. walking through all possible combinations of the inputs, or in a slimmer manner wherein at least some of the inputs are varied by random selection, optionally skewed to increase the appearance of inputs with a larger training effect.

Figure 1:
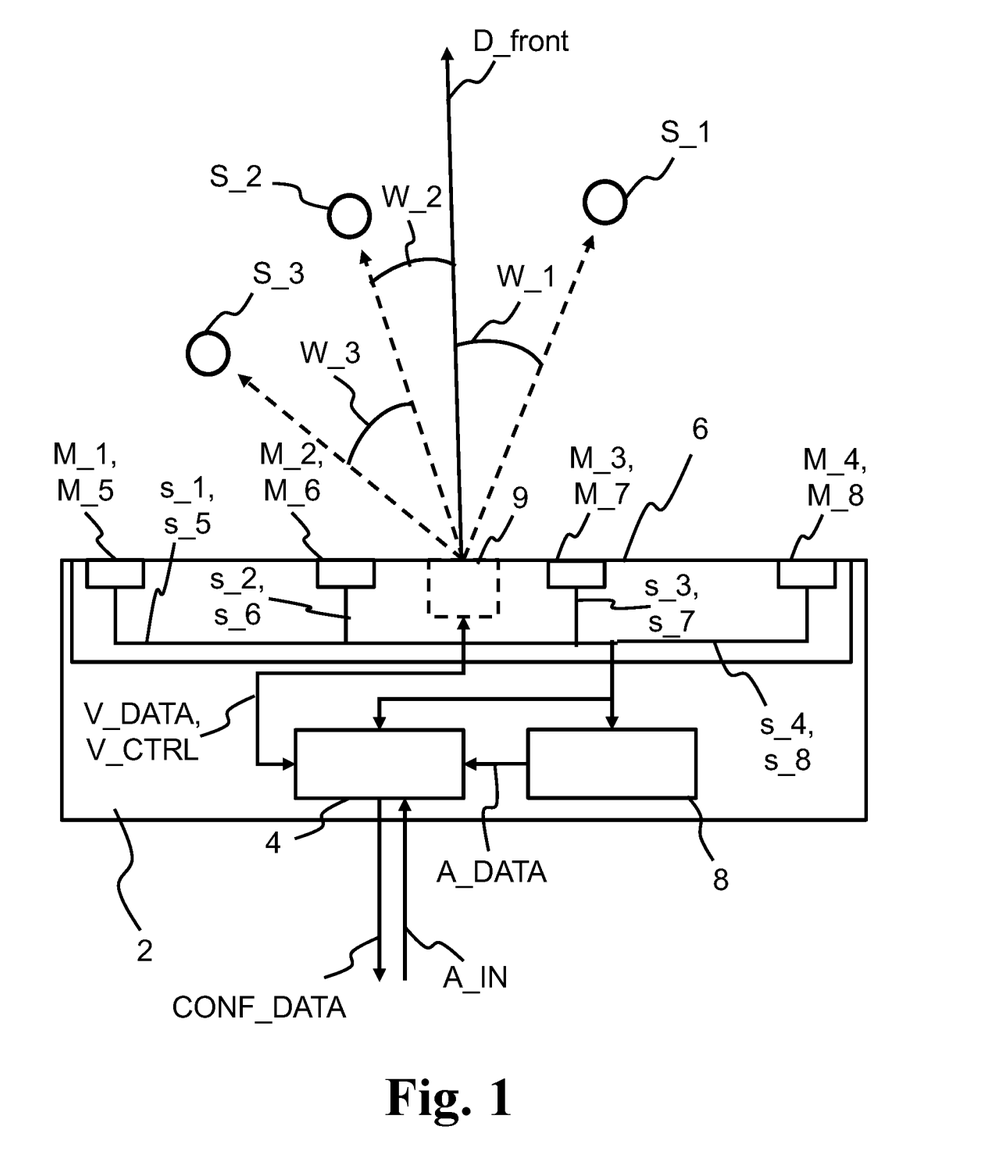
FIG. 1 schematically illustrates an exemplary conference device according to the present disclosure, FIG. 2 schematically illustrates exemplary parts of a conference device according to the present disclosure.

FIG. 1 shows a block diagram of an exemplary conference device. The conference device 2 comprises a conference controller 4; a microphone array 6 comprising a plurality of microphones (M_1, M_2, . . . , M_8) for provision of audio signals representing audio from one or more sound sources S_1, S_2, S_3 positioned at respective angles W_1, W_2, and W_3 in relation to a front direction D_front of the conference device; and a direction estimator 8 connected to the conference controller 4 and the microphone array 6. In FIG. 1, W_1 is about 25 degrees, W_2 is about −20 degrees, and W_3 is about −50 degrees.

The direction estimator 8 is configured to obtain, from the microphone array 6, a plurality of audio signals s_1, s_2, . . . s_8 including a first audio signal s_1 from the first microphone M_1 and a second audio signal s_2 from the second microphone M_2; determine direction data based on the plurality of audio signals; and output audio data A_DATA based on the direction data to the conference controller 4. The direction data and optionally the audio data comprise an indication of an estimated probability of voice activity for a plurality of directions and to determine direction data comprises to apply an offline-trained neural network.

The conference device 2 may comprise a camera device 9 comprising one or more cameras. The camera device 9 is connected to the conference controller 4 and is optionally configured for provision of a camera video stream/video data V_DATA to the conference controller 4. The conference controller 4 optionally controls the camera device 9 via control signals V_CTRL. The conference controller 4 is configured to provide conference data CONF_DATA based on video data V_DATA and audio signals s_1, s_2, . . . , s_8. The conference data CONF_DATA comprises an output video stream based on the camera video stream, an output audio stream based on the audio signals s_1, s_2, . . . , s_8, and optionally the audio data A_DATA indicative of an estimated probability of voice activity for one or more directions.

The conference controller 4 may control the camera device 9 to provide a desired camera video stream V_DATA via control signals V_CTRL. The control signals V_CTRL may be based on the audio data A_DATA. For example, the conference controller 4 may be configured to control the camera device 9 to zoom to a first region in the first direction if DOA of the audio data indicates the first direction as the main direction of arrival. The conference controller 4 may be configured to zoom on a first region in the V_DATA according to DOA of the audio data A_DATA.

Generally, the conference controller 4 may be configured to control the camera device 9 to zoom to an m'th region in the m'th direction if DOA of the audio data indicates the m'th direction as the main direction of arrival. The conference controller 4 may be configured to zoom on an m'th region in the V_DATA according to DOA indicating an m'th direction of the audio data A_DATA.

The conference controller 4 may be configured to control the camera device 9 to provide a field-of-view or non-zoomed video stream if a non-voice activity parameter NVA optionally comprised by the audio data A_DATA is indicative of non-voice, e.g. if NVA is larger than a threshold. The conference controller 4 may be configured to provide a field-of-view or non-zoomed video stream as the output video stream if the non-voice activity parameter NVA is indicative of non-voice, e.g. if NVA is larger than a threshold.

The conference device 2 may comprise one or more loudspeakers (not shown in FIG. 1) configured to output audio based on an input audio stream A_IN, e.g. received via an interface/connector, such as a wireless interface, or a USB-A or USB-C connector. The conference data CONF_DATA and the input audio stream A_IN may be output/received via the same interface, such as the same wireless interface, or USB-A or USB-C connector. The conference controller 4 may be configured to detect audio activity, such as voice activity, in the input audio stream A_IN and deactivate, pause, ignore or turn off, the direction estimator in accordance with a determination of audio/voice activity. Thus, the conference device 2/conference controller 4 is optionally configured to deactivate the direction estimator 8 based on detection of voice activity from a far end conference device.

Figure 2:
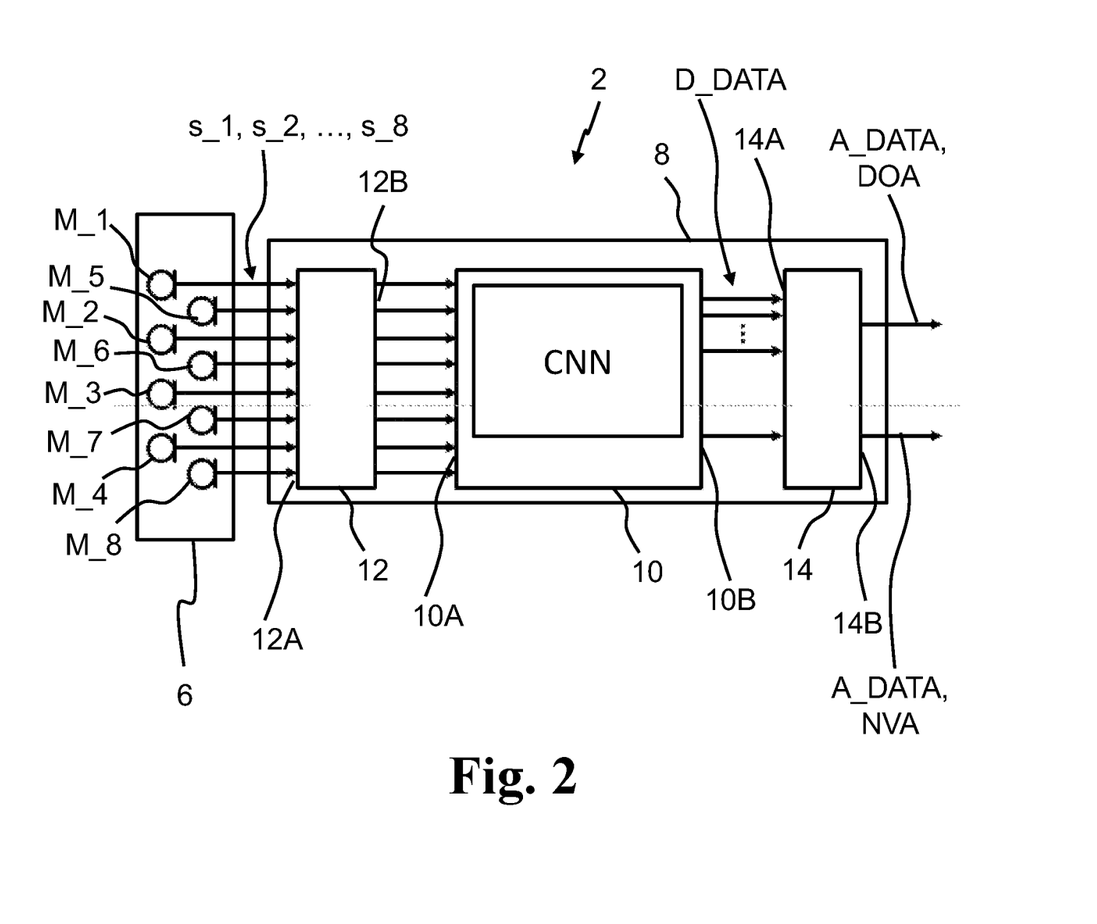

FIG. 2 shows parts of conference device 2 in more detail. The direction estimator 8 comprises a neural network module 10 implementing an offline-trained neural network and having and input 10A and an output 10B. The direction estimator 8 optionally comprises a pre-processor 12 and a post-processor 14 having respective inputs 12A, 14A and outputs 12B, 14B. The input 12A of the pre-processor 12 is connected to the microphones M_1, M_2, . . . , M_8 of microphone array 6 for receiving audio signals s_1, s_2, . . . , s_8 from the microphones M_1, M_2, . . . , M_8. The pre-processor 12 pre-processes the audio signals s_1, s_2, . . . , s_8 from the microphones M_1, M_2, . . . , M_8 and provides a neural network input via output 12B to input 10A of the neural network module 10. The neural network module 10 applies convolutional neural network CNN to the neural network input and provides direction data D_DATA via output 10B to input 14A of post-processor 14. The post-processor 14 determines and output audio data A_DATA including main direction of arrival DOA and non-voice activity parameter NVA to the conference controller (not shown) based on the direction data D_DATA.

The neural network CNN is configured to determine the direction data D_DATA, wherein to determine the direction data comprises to estimate direction probabilities $P\_D\_m$, m=1, 2, . . . , M for M directions including a first direction probability P_D_1 indicative of a probability of voice activity in a first direction D_1 and to estimate a second direction probability P_D_2 indicative of a probability of voice activity in a second direction D_2. Further, to determine the direction data comprises to estimate a non-voice activity parameter NVA indicative of a probability of absence of voice activity in the audio signals.

In one or more direction estimators, the direction data is a vector comprising 37 direction probabilities of respective 37 directions, the directions spanning directions from −90 degrees to 90 degrees and a non-voice activity parameter NVA. Thus D_DATA may be given as:

$$D_{DATA} = \begin{bmatrix} P\_D\_1 \\ P\_D\_2 \\ \vdots \\ P\_D\_37 \\ NVA \end{bmatrix},$$

where P_D_m corresponds to a direction D_m with an angle V_m of:

$$V\_m = V\_ID \left( m - 1 - \frac{M-1}{2} \right),$$

where V_ID is the inter-direction angle between two neighbouring directions.

The inter-direction angle V_ID may be given as:

$$V\_ID = \frac{V\_span}{M-1},$$

where V_span is the angle range spanned by the directions D_m and M is the number of directions. The neural network CNN has been trained to detect voice in directions spanning at least −45 degrees to 45 degrees and in particular directions from −90 degrees to 90 degrees in relation to a front direction of the microphone array 6, the directions having a pre-defined angle therebetween. The pre-defined angle may be less than 10 degrees, e.g. 5 degrees.

The pre-processor 12 provides a neural network input to the neural network based on the audio signals. In the illustrated conference device 2, the pre-processor 12 is configured to determine real spectrograms also denoted P_R_n and imaginary spectrograms P_I_n of the audio signals s_n of microphone M_n and provide the real spectrograms P_R_n and the imaginary spectrograms P_I_n in the neural network input for n=1, 2, ..., N, where N is the number of microphones in the microphone array.

The neural network CNN is optionally configured to estimate a distance parameter indicative of a distance between the conference device and a sound source, such as a distance between the conference device and a sound source in the main direction of arrival. In other words, to determine direction data D_DATA in the neural network may comprise to estimate a distance parameter also denoted SSD indicative of a distance between the conference device and a sound source. The distance parameter may be included in the audio data, i.e. the audio data may comprise a distance parameter also indicative of a distance between the conference device and a sound source.

Figure 3:
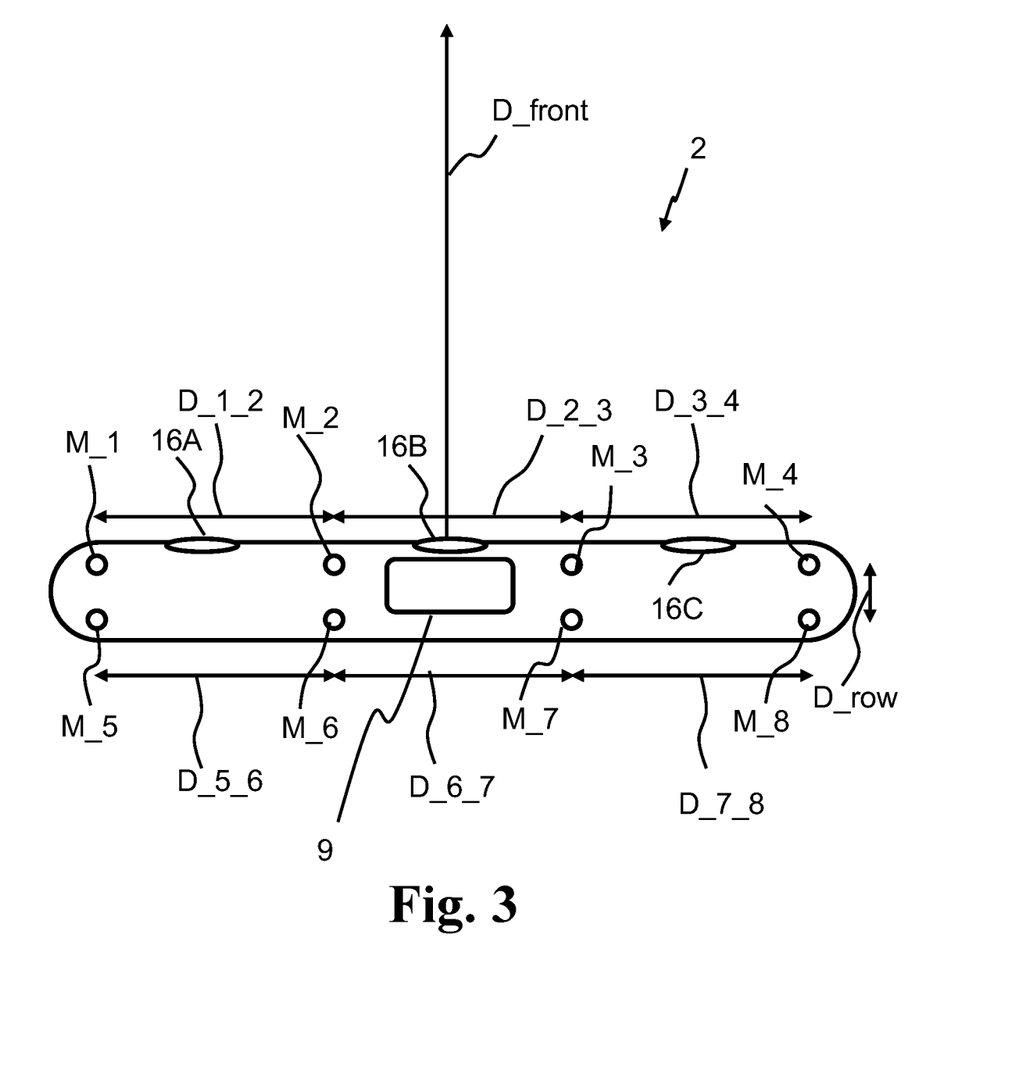
FIG. 3 is a top view of an exemplary conference device.

FIG. 3 shows a top view of an exemplary conference device. i.e a view of the conference device from above the conference device in the intended use position. The conference device 2 comprises eight microphones M_1, M_2, ..., M_8 optionally arranged in a 2×4 matrix configuration. The distance D_1_2 between the first microphone M_1 and the second microphone M_2 is in the range from 5 cm to 30 cm. The distance D_2_3 between the second microphone M_2 and the third microphone M_3 is in the range from 5 cm to 30 cm. The distance D_3_4 between the third microphone M_3 and the fourth microphone M_4 is in the range from 5 cm to 30 cm. The distance D_5_6 between the fifth microphone M_5 and the sixth microphone M_6 is in the range from 5 cm to 30 cm. The distance D_6_7 between the sixth microphone M_6 and the seventh microphone M_7 is in the range from 5 cm to 30 cm. The distance D_7_8 between the seventh microphone M_7 and the eighth microphone M_8 is in the range from 5 cm to 30 cm. The conference device may have a column distance between neighbouring columns of microphones in the range from 5 cm to 30 cm, such as 20 cm. For example, distances D_1_2, D_2_3, D_3_4, D_5_6, D_6_7, and D_7_8 may be 20 cm. The row distance D_row between the first row or front row of microphones M_1-M_4 and the second row or back row of microphones M_5-M_8 is in the range from 2 cm to 15 cm, such as 5 cm. Other microphone configurations, such as six microphones in a 1×6 or 2×3 matrix configuration or four microphones in a 1×4 or 2×2 matrix configuration, may be applied in the conference device. Arranging the microphones in at least a front row and a back row allows the conference device to separate and distinguish between audio in front of and behind the conference device. The conference device 2 optionally comprises a camera device 9 for provision of a camera video stream. Further, the conference device 2 optionally comprises one or more loudspeakers 16A, 16B, 16C for output of audio representative of the audio input stream A_IN received via an interface, such as a wireless interface, or a USB-A or USB-C connector, of the conference device 2.

Figure 4:
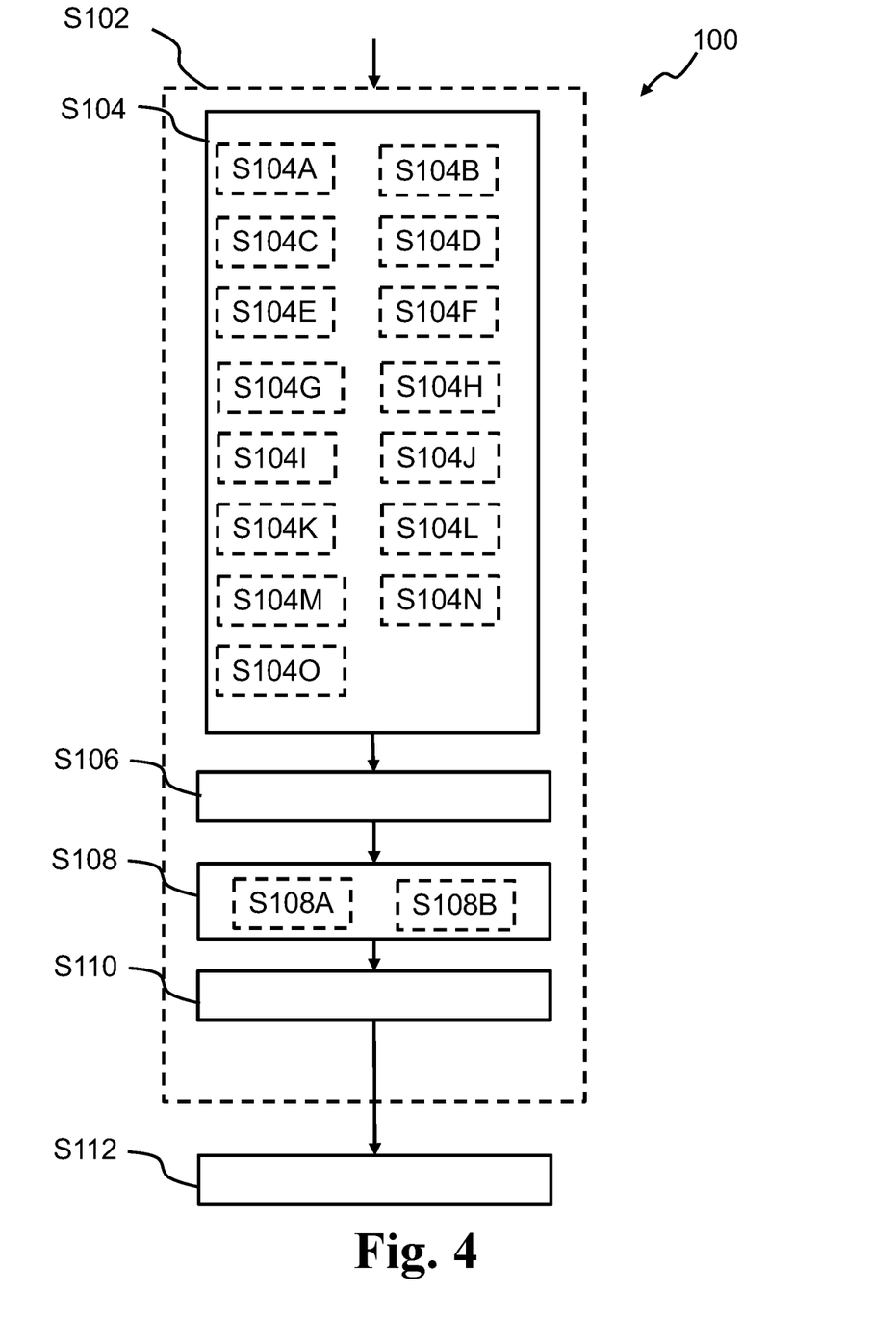
FIG. 4 is a flow diagram of an exemplary method according to the present disclosure

FIG. 4 shows a flow chart of an exemplary method of training a neural network, e.g. for determining direction of arrival of audio. The method 100 is a computer-implemented method for training a neural network, such as a CNN, of a conference device, e.g. conference device 2, to process as inputs a plurality of audio signals comprising a first audio signal and a second audio signal obtained from a microphone array arranged in a conference room and provide as output, e.g. as direction data, an indication of an estimated probability of voice activity for a plurality of directions relative to the microphone array, such as microphone array 6.

The method 100 comprises executing S102, by a computer, multiple training rounds, wherein each training round comprises determining S104 a training data set comprising a first training audio signal, a second training audio signal, and a target direction; applying S106 the first training audio signal and the second training audio signal as respective inputs to the neural network; determining S108 an error signal based on an output of the neural network and the target direction; and using S110 a learning rule to adjust weights of the neural network based on the error signal. In the method 100, determining S104 a training data set is based on of a user speech signal selected from a plurality of speech signals each indicating speech from a first person; a noise sound signal selected from a plurality of noise sound signals each indicating an ambient noise sound; a room model selected from a plurality of room models each indicating a spatial extension and one or more acoustic properties of a conference room; a user position within the spatial extension indicated by the selected room model; and an array position defining a first microphone position and a second microphone position within the spatial extension indicated by the selected room model. Accordingly, determining S104 a training data set comprises: obtaining S104A a user speech signal selected from a plurality of speech signals each indicating speech from a first person; optionally obtaining S104B a noise sound signal selected from a plurality of noise sound signals each indicating an ambient noise sound; obtaining S104C a room model selected from a plurality of room models each indicating a spatial extension and one or more acoustic properties of a conference room; obtaining S104D a user position within the spatial extension indicated by the selected room model; and obtaining S104E an array position defining a first microphone position and a second microphone position within the spatial extension indicated by the selected room model.

Further, in the method 100 determining the first training audio signal and the second training audio signal in S104 comprises determining S104F a first impulse response of a first acoustic path from the user position to the first microphone position and a second impulse response of a second acoustic path from the user position to the second microphone position based on one or more acoustic properties indicated by the selected room model; estimating S104G first sound arriving at the first microphone position by combining the result of applying the first impulse response to the speech indicated by the selected user speech signal and the ambient noise sound indicated by the selected noise sound signal; estimating S104H second sound arriving at the second microphone position by combining the result of applying the second impulse response to the speech indicated by the selected user speech signal and the ambient noise sound indicated by the selected noise sound signal; and determining S104I the first training audio signal based on the first sound and the second training audio signal based on the second sound, In the method 100, determining the target direction in S104 comprises determining S104J a direction of arrival of user speech at the microphone array based on the user position and the array position; and selecting S104K the target direction from the plurality of directions, e.g. such that the target direction does not differ more from the determined direction of arrival than any other direction in the plurality of directions.

In method 100, determining S104 a training data set is optionally based on a jammer speech signal and a jammer position, the jammer speech signal selected from a plurality of speech signals each indicating speech from a second person different from the first person and the jammer position being within the spatial extension indicated by the selected room model. Accordingly, the method 100 optionally comprises obtaining S104L a jammer speech signal and a jammer position, and determining the first training audio signal and the second training audio signal in S104 may comprise determining S104M a third impulse response of a third acoustic path from the jammer position to the first microphone position and a fourth impulse response of a fourth acoustic path from the jammer position to the second microphone position using one or more acoustic properties indicated by the selected room model, the method 100 optionally proceeding to estimating S104N the first sound by combining the result of applying the first impulse response to the speech indicated by the selected user speech signal, a result of applying the third impulse response to the jammer speech signal, and the ambient noise sound indicated by the selected noise sound signal, and estimating S104O the second sound by combining the result of applying the second impulse response to the speech indicated by the selected user speech signal, a result of applying the fourth impulse response to the jammer speech signal, and the ambient noise sound indicated by the selected noise sound signal.

It is noted that a number of training rounds may be executed based on a user speech signal, a noise sound signal, and a jammer speech signal. Further, a number of auxiliary training rounds may be executed as described above, however based only on a user speech signal, i.e. without noise sound signal and jammer speech signal. Further, a number of auxiliary training rounds may be executed as described above, however based only on a jammer speech signal and/or a noise sound signal, i.e. without a user speech signal.

In method 100, determining S108 the error signal comprises determining S108A a classification error for each of the plurality of directions, e.g. based on the respective probability of voice activity indicated in the output of the neural network, for example such that the classification error for the target direction increases when the indicated probability of voice activity decreases and the classification error for each other direction increases when the indicated probability of voice activity increases; and determining S108B the error signal based on the classification errors for all of the plurality of directions.

In the method 100, determining the target direction in S104 may further comprise determining (not shown) a target distance between the user position and the array position; and determining S108 the error signal may further comprise determining (not shown) a classification error for a distance parameter indicated in the output of the neural network in dependence on the indicated distance parameter and the target distance; and determining S108B the error signal may further be based on the classification errors for the distance parameter.

The method 100 comprises applying S112 the neural network in a conference device, e.g. by storing weights of the neural network in neural network module, such as neural network module 10 of conference device 2.

In the method 100 some of the method steps required for determining S104 a training data set, such as steps that produce the same results for all training rounds, may be executed prior to the training, i.e. prior to executing the first training round, while other steps may be executed during the training, e.g. interleaved with training rounds and/or during training rounds. Obviously, avoiding repetitive computations may preserve both energy and time.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information (such as information indicative of the neural network, such as configuration and parameters/weights thereof) in a part of the memory.

Furthermore, the labelling of a first element does not imply the presence of a second element and vice versa.

It may be appreciated that FIGS. 1-4 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented.

Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc.

Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES 2 conference device
4 conference controller
6 microphone array
8 direction estimator
9 camera device
10 neural network module
10A input of neural network
10B output of neural network
12 pre-processor
12A input of pre-processor
12B output of pre-processor
14 post-processor
14A input of post-processor
14B output of post-processor
16A first loudspeaker, first speaker unit
16B second loudspeaker, second speaker unit
16C third loudspeaker, third speaker unit
100 method of training a neural network
S102 executing multiple training rounds
S104 determining a training data set
S104A obtaining user speech signal
S104B obtaining a noise sound signal
S104C obtaining a room model
S104D obtaining a user position within the spatial extension indicated by the selected room model
S104E obtaining an array position defining a first microphone position and a second microphone position
S104F determining a first impulse response of a first acoustic path, and a second impulse response of a second acoustic path
S104G estimating first sound arriving at the first microphone position
S104H estimating second sound arriving at the second microphone position
S104I determining the first training audio signal based on the first sound and the second training audio signal based on the second sound
S104J determining a direction of arrival of user speech at the microphone array
S104K selecting the target direction from the plurality of directions
S104L obtaining a jammer speech signal and a jammer position
S104M determining a third impulse response of a third acoustic path and a fourth impulse response of a fourth acoustic path
S104N estimating the first sound
S104O estimating the second sound
S106 applying the first training audio signal and the second training audio signal
S108 determining an error signal
S108A determining a classification error for each of the plurality of directions
S108B determining the error signal based on the classification errors
S110 using a learning rule to adjust weights of the neural network based on the error signal
S112 apply neural network
A_DATA audio data from direction estimator
A_IN input audio stream
CONF_DATA conference data from conference controller
D_front front direction, zero-direction
D_DATA direction data
DOA main direction of arrival
M_1 first microphone
M_2 second microphone
M_3 third microphone
M_4 fourth microphone
M_5 fifth microphone M_6 sixth microphone
M_7 seventh microphone
M_8 eighth microphone
NVA non-voice activity parameter
s_1 first audio signal from first microphone
s_2 second audio signal from second microphone
s_3 third audio signal from third microphone
s_4 fourth audio signal from fourth microphone
s_5 fifth audio signal from fifth microphone
s_6 sixth audio signal from sixth microphone
s_7 seventh audio signal from seventh microphone
s_8 eighth audio signal from eighth microphone
S_1 first audio source
S_2 second audio source
S_3 third audio source
W_1 first angle of first audio source
W_2 second angle of second audio source
W_3 third angle of third audio source
V_DATA video data from camera device, camera video stream
V_CTRL control signals from conference controller

The invention claimed is:

1. A conference device comprising:
a conference controller;
a microphone array comprising a plurality of microphones for provision of audio signals representing audio from one or more sound sources;
a direction estimator connected to the conference controller and the microphone array, the direction estimator configured to:
obtain, from the microphone array, a plurality of audio signals including a first audio signal and a second audio signal;
determine direction data based on the plurality of audio signals, the direction data comprising an indication of an estimated probability of voice activity for a plurality of directions, wherein to determine direction data comprises to apply an offline-trained neural network; and
output audio data based on the direction data to the conference controller.

2. Conference device according to claim 1, wherein the neural network is configured to determine the direction data, wherein to determine the direction data comprises to estimate a first direction probability indicative of a probability of voice activity in a first direction and to estimate a second direction probability indicative of a probability of voice activity in a second direction.

3. Conference device according to claim 1, wherein the direction estimator comprises a post-processor configured to post-process the direction data and determine a main direction of arrival based on the direction data, and include the main direction of arrival in the audio data.

4. Conference device according to claim 1, wherein the audio data comprises a non-voice activity parameter indicative of a probability of absence of voice activity in the audio signals.

5. Conference device according to claim 1, wherein the audio data comprises one or more direction probabilities indicative of a probability of voice activity in respective one or more directions.

6. Conference device according to claim 1, wherein the direction data covers directions spanning at least −45 degrees to 45 degrees in relation to a front direction of the microphone array, the directions having a pre-defined angle therebetween.

7. Conference device according to claim 1, wherein the direction data comprises direction data of at least 10 directions.

8. Conference device according to claim 1, wherein to determine direction data comprises to estimate a noise probability indicative of a probability of presence of noise in the audio signals.

9. Conference device according to claim 8, wherein to estimate a noise probability indicative of a probability of presence of noise in the audio signals comprises to estimate a first noise probability indicative of a probability of presence of noise in the first direction and to estimate a second noise probability indicative of a probability of presence of noise in the second direction.

10. Conference device according to claim 1, wherein the direction estimator comprises a pre-processor configured to pre-process the audio signals and provide a neural network input to the neural network based on the audio signals.

11. Conference device according to claim 10, wherein the pre-processor is configured to determine a first real spectrogram of the first audio signal and a first imaginary spectrogram of the first audio signal and provide the first real spectrogram and the first imaginary spectrogram in the neural network input.

12. Conference device according to claim 1, wherein the direction estimator comprises a post-processor configured to post-process a neural network output from the neural network and provide the audio data based on the neural network output.

13. Conference device according to claim 1, wherein the neural network is a deep neural network, such as a convolutional neural network.

14. Conference device according to claim 1, wherein the microphone array comprises at least 4 microphones, the plurality of audio signals including at least a third audio signal and a fourth audio signal.

15. Conference device according to claim 1, wherein the conference device comprises a camera connected to the conference controller for provision of a camera video stream, and wherein the conference controller is configured to determine an output video stream based on the camera video stream and the audio data.

16. Conference device according to claim 1, wherein the conference device is configured to deactivate the direction estimator based on detection of voice activity from a far end conference device.

17. Conference device according to claim 1, wherein to determine direction data comprises to estimate a distance parameter indicative of a distance between the conference device and a sound source.

18. A computer-implemented method for training a neural network to process as inputs a plurality of audio signals comprising a first audio signal and a second audio signal obtained from a microphone array arranged in a conference room and provide as output an indication of an estimated probability of voice activity for a plurality of directions relative to the microphone array, wherein the method comprises executing, by a computer, multiple training rounds, wherein each training round comprises:
determining a training data set comprising a first training audio signal, a second training audio signal, and a target direction;
applying the first training audio signal and the second training audio signal as respective inputs to the neural network;
determining an error signal based on an output of the neural network and the target direction; and using a learning rule to adjust weights of the neural network based on the error signal, wherein determining a training data set is based on:
  a user speech signal selected from a plurality of speech signals each indicating speech from a first person;
  a noise sound signal selected from a plurality of noise sound signals each indicating an ambient noise sound;
  a room model selected from a plurality of room models each indicating a spatial extension and one or more acoustic properties of a conference room;
  a user position within the spatial extension indicated by the selected room model; and
  an array position defining a first microphone position and a second microphone position within the spatial extension indicated by the selected room model, wherein determining the first training audio signal and the second training audio signal comprises:
  determining a first impulse response of a first acoustic path from the user position to the first microphone position and a second impulse response of a second acoustic path from the user position to the second microphone position based on one or more acoustic properties indicated by the selected room model;
  estimating first sound arriving at the first microphone position by combining the result of applying the first impulse response to the speech indicated by the selected user speech signal and the ambient noise sound indicated by the selected noise sound signal;
  estimating second sound arriving at the second microphone position by combining the result of applying the second impulse response to the speech indicated by the selected user speech signal and the ambient noise sound indicated by the selected noise sound signal; and
  determining the first training audio signal based on the first sound and the second training audio signal based on the second sound, wherein determining the target direction comprises:
  determining a direction of arrival of user speech at the microphone array based on the user position and the array position; and
  selecting the target direction from the plurality of directions such that the target direction does not differ more from the determined direction of arrival than any other direction in the plurality of directions, and wherein determining the error signal comprises:
  determining a classification error for each of the plurality of directions based on the respective probability of voice activity indicated in the output of the neural network such that the classification error for the target direction increases when the indicated probability of voice activity decreases and the classification error for each other direction increases when the indicated probability of voice activity increases; and
  determining the error signal based on the classification errors for all of the plurality of directions.

19. Method according to claim 18, wherein determining a training data set is further based on a jammer speech signal and a jammer position, the jammer speech signal selected from a plurality of speech signals each indicating speech from a second person different from the first person and the jammer position being within the spatial extension indicated by the selected room model, and wherein determining the first training audio signal and the second training audio signal comprises:
  determining a third impulse response of a third acoustic path from the jammer position to the first microphone position and a fourth impulse response of a fourth acoustic path from the jammer position to the second microphone position using one or more acoustic properties indicated by the selected room model;
  estimating the first sound by combining the result of applying the first impulse response to the speech indicated by the selected user speech signal, a result of applying the third impulse response to the jammer speech signal, and the ambient noise sound indicated by the selected noise sound signal; and
  estimating the second sound based on by combining the result of applying the second impulse response to the speech indicated by the selected user speech signal, a result of applying the fourth impulse response to the jammer speech signal, and the ambient noise sound indicated by the selected noise sound signal.

* * * * *